United States Patent
Suh

(10) Patent No.: US 8,254,759 B2
(45) Date of Patent: Aug. 28, 2012

(54) BROADCASTING SIGNAL PROCESSING APPARATUS AND METHOD THEREOF FOR RECORDING AND REPRODUCING WITH RESPECT TO HARD DISC DRIVE

(75) Inventor: In-Kyo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1485 days.

(21) Appl. No.: 10/986,171

(22) Filed: Nov. 12, 2004

(65) Prior Publication Data

US 2006/0104610 A1 May 18, 2006

(51) Int. Cl.
*H04N 5/94* (2006.01)

(52) U.S. Cl. ...................................... 386/277

(58) Field of Classification Search ............... 386/1, 46, 386/111–112, 52, 94–96, 125–126, 83; 707/1, 707/2, 200, 202, 205, 206; 711/100, 1, 165, 711/173; 360/31; 369/360
See application file for complete search history.

(56) References Cited

U.S. PATENT DOCUMENTS

| | | | |
|---|---|---|---|
| 5,737,290 A * | 4/1998 | Ohmori ................... | 369/53.21 |
| 2001/0018727 A1 * | 8/2001 | Ando et al. ............... | 711/112 |
| 2002/0052864 A1 * | 5/2002 | Yamamoto ................ | 707/1 |
| 2004/0111582 A1 * | 6/2004 | Maeda et al. ............. | 711/202 |
| 2004/0136693 A1 * | 7/2004 | Iwasaki et al. ........... | 386/95 |

FOREIGN PATENT DOCUMENTS

| | | |
|---|---|---|
| JP | 06-333367 | 12/1994 |
| JP | 07-129330 | 5/1995 |
| JP | 2000-324435 | 11/2000 |
| JP | 2001-229654 | 8/2001 |
| KR | 10-2001-0042757 A | 5/2001 |

* cited by examiner

*Primary Examiner* — William C Vaughn, Jr.
*Assistant Examiner* — Eileen Adams
(74) *Attorney, Agent, or Firm* — Roylance, Abrams, Berdo and Goodman, LLP

(57) ABSTRACT

A broadcast signal processing apparatus that is capable of recording and reproducing an externally received broadcast signal with respect to a hard disc drive, and which includes a broadcast signal receiving part for receiving a broadcast signal, demodulating and dividing the received broadcast signal into a video and audio signal, a hard disc drive formatted in a file allocation table (FAT) form, and wherein the HDD has a FAT and a data region, and a control part for recording, searching and reproducing the audio and video signals with respect to the HDD based on the FAT file system. When the FAT is updated, the apparatus is further capable of adding a temporary file termination data to an end of the updated data, and converting, corresponding to a recording stop signal, the temporary file termination data into a normal file termination data according to the FAT file system.

8 Claims, 5 Drawing Sheets

| A₀ | A₁ | FF | F₁ | ... | ... | ... | ... | ... |
|---|---|---|---|---|---|---|---|---|

(b) (t = T₁)

| A₀ | A₁ | A₂ | A₃ | FF | F₁ | ... | ... | ... |
|---|---|---|---|---|---|---|---|---|

(c) (t = T₂)

| A₀ | A₁ | A₂ | A₃ | A₄ | A₅ | FF | F₁ | ... |
|---|---|---|---|---|---|---|---|---|

(d) (t = T₃)

| A₀ | A₁ | A₂ | A₃ | A₄ | A₅ | FF | FF | ... |
|---|---|---|---|---|---|---|---|---|

…

BROADCASTING SIGNAL PROCESSING APPARATUS AND METHOD THEREOF FOR RECORDING AND REPRODUCING WITH RESPECT TO HARD DISC DRIVE

BACKGROUND OF THE INVENTION

1. Field of the Invention

The present invention relates to a broadcasting signal processing apparatus and a method for recording to and reproducing from a hard disc drive (HDD). More particularly, the present invention relates to a broadcasting signal processing apparatus, and method of operating the same, capable of recording/reproducing on the HDD which can prevent loss of recorded data due to an abnormal termination when a broadcast signal is received and stored at the HDD of a personal video recorder (PVR).

2. Description of the Related Art

Recently, as storage capacities of hard disc drives (HDD) have improved, and the prices have decreased, many electronic appliances employ a HDD therein, to store or process large amounts of data and increase the capabilities of the electronic appliances. For example, at least one or more PVR set-top boxes have been developed that have a HDD and a PVR function capable of recording a broadcasting signal on a real time basis.

FIG. 1 is a flow chart illustrating the conventional operation of recording a broadcast signal at the PVR set-top box. Referring to FIG. 1, an external broadcast signal is received in step S10. When a user's command to record the received broadcast signal recording is received (step S20), the received broadcast signal is recorded in a data region of the HDD. Accordingly, the file allocation table (FAT) information is updated.

HDDs are partitioned upon installation or at the time of manufacture. When the HDD is partitioned, sectors, which are the smallest unit of space of the HDD that can be accessed, are assigned or grouped into clusters. Thus, a cluster is a group of sectors. Since each sector comprises 512 bytes, a cluster is some integer multiple of 512 bytes. The FAT keeps track of each cluster, what file is stored in each (there are generally more than one cluster per file) cluster, and which clusters are open, or have no files stored in them. In step S30, the received broadcast signal is stored in the HDD, and the FAT is updated as to which cluster or clusters the data has been stored in.

Following step S30, in the conventional method, it is determined, in decision step S40, whether an abnormal termination of the recording of the broadcast signal has occurred. If there was no abnormal termination of the recording of the broadcast signal ("No" path from decision step S40), the method then determines whether there is a user's command terminating recording of the received broadcast signal in decision step S50. If there is a user's command for terminating recording of the received broadcast signal ("Yes" path from decision step S50), recording on the data region in the HDD is terminated, and a data indicating the end of recording in the cluster ("cluster end data") (such as FFFF hex) is recorded in the FAT for the corresponding cluster. The recording of the "cluster end data" takes place in the FAT at the position that corresponds to the last cluster where data for the received broadcast signal was recorded (step S60). If a user wishes to reproduce or search for the recorded file later, it is possible only if the "cluster end data" has been properly recorded in the FAT.

If an abnormal termination of the recording of the received broadcast signal occurs as a result of power loss, for example, the "cluster end data" is not recorded in the FAT and recording is terminated anyway. Because of this, the operating system associated with the HDD can not recognize the data recorded at the data region as a file because the FAT does not recognize it as such. This occurs even though a file is recorded at the data region of the HDD. Consequently, some portion of the data recorded that corresponds to the received broadcast signal can be lost.

SUMMARY OF THE INVENTION

The present invention has been developed in order to solve the drawbacks discussed above and other problems associated with the conventional arrangement as well as to provide numerous other advantages. An aspect of the present invention is to provide a broadcast signal processing apparatus capable of recording to and reproducing from a hard disc drive that is capable of preserving the stored data to a termination time even when recording is abnormally terminated.

According to an aspect of the present invention, there is provided a broadcasting signal processing apparatus capable of recording an externally received broadcast signal to a hard disc drive, and reproducing the signal from the HDD, comprising a broadcast signal receiving part for receiving a broadcast signal, demodulating and dividing the received broadcast signal into a video and an audio signal, a hard disc drive formatted to include a file allocation table (FAT), the HDD having a FAT and a data region, and a control part for controlling the recording, searching and reproducing of the audio and video signal with respect to the HDD based on the FAT file system. Furthermore, the apparatus according to an embodiment of the present invention further comprises a control part that when the FAT is updated, a certain temporary file termination data is added to the end of the updated data, and in response to a certain recording stop signal, the temporary file termination data is converted into a normal file termination data according to the FAT file system.

The control part according to an embodiment of the present invention further comprises controlling the update of the FAT such that the updated data is overwritten from a position where the temporary file termination data is recorded if the temporary file termination data exists.

The control part according to an embodiment of the present invention preferably controls the reproducing and searching of the recorded file such that the temporary file termination data is converted into the normal file termination data if the temporary file termination data exists at the FAT.

The broadcasting signal processing apparatus according to an embodiment of the present invention further comprises a decoder for decoding either the video and audio signal output from the broadcast signal receiving part, or the file recorded at the hard disc drive, an encoder for converting the video signal output from the decoder into an analog video signal and providing the signal for external use, and an audio digital-to-analog converter part for converting the audio signal output from the decoder into an analog audio signal and providing the signal for external use.

According to an aspect of the present invention, there is provided a hard disc drive recording and reproducing method of a broadcast signal processing apparatus that is capable of recording and reproducing an externally received broadcast signal with respect to a hard disc drive, comprising formatting the hard disc drive to a FAT form having a FAT and a data region, receiving the broadcast signal and demodulating and dividing the received broadcast signal into a video and an audio signal part, recording the received broadcast signal and video signal to the HDD based on a file system of FAT form, and updating the FAT. The method for recording and reproducing a broadcast signal further comprises adding temporary file termination data to the end of the updated data, terminating recording by converting the temporary file termination data, in response to a record stop signal into a normal file termination data based on the FAT file system and reproducing or searching the recorded file based on a file system of the FAT form.

The step of recording to the HDD according to an embodiment of the present invention comprises, when updating the FAT, overwriting and recording the updated data from a position where the temporary file termination data is recorded if temporary file termination data exists.

The step of reproducing or searching according to an embodiment of the present invention comprises determining if the temporary file termination data exists in the FAT corresponding to the file reproduced or searched and if the temporary file termination data does exist, converting the temporary file termination data into the normal file termination data.

The hard disc drive recording and reproducing method of a broadcast signal processing apparatus according to an embodiment of the present invention can further comprise decoding either the video and audio signal output from the received broadcast signal or the file recorded to the hard disc drive, converting the video signal output from the decoded analog video signal, and providing it externally and converting the audio signal output from the decoding step into an analog audio signal and providing it externally.

BRIEF DESCRIPTION OF THE DRAWINGS

The above aspects and features of the present invention will be more apparent by describing certain embodiments of the present invention with reference to the accompanying drawings, in which:

FIG. 5 is a view provided for the explanation of the operation of a broadcast signal processing apparatus capable of recording and reproducing at a hard disc drive according to an embodiment of the present invention.

DETAILED DESCRIPTION OF THE EXEMPLARY EMBODIMENTS

Figure 1:
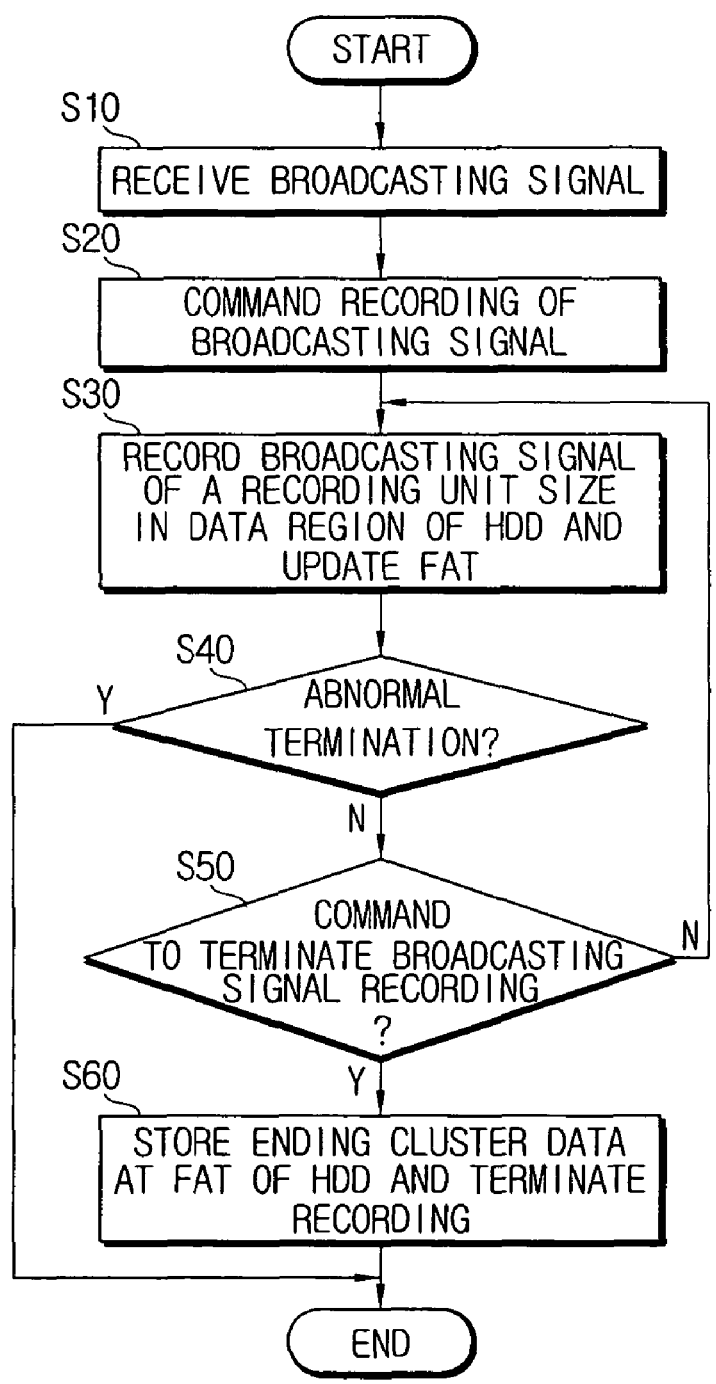
FIG. 1 is a flow chart illustrating the operation of a conventional broadcast signal processing apparatus capable of recording to and reproducing from a hard disc drive (HDD)

Certain embodiments of the present invention will be described in greater detail with reference to the accompanying drawings.

In the following description, the same drawing reference numerals are used for the same elements in the drawings. The matters defined in the description such as a detailed construction and elements are provided to assist in a comprehensive understanding of the invention. Thus, it is apparent to those skilled in the art of the present invention that the present invention can be carried out without those defined matters. Also, well-known functions or constructions are not described in detail for purposes of conciseness.

Figure 2:
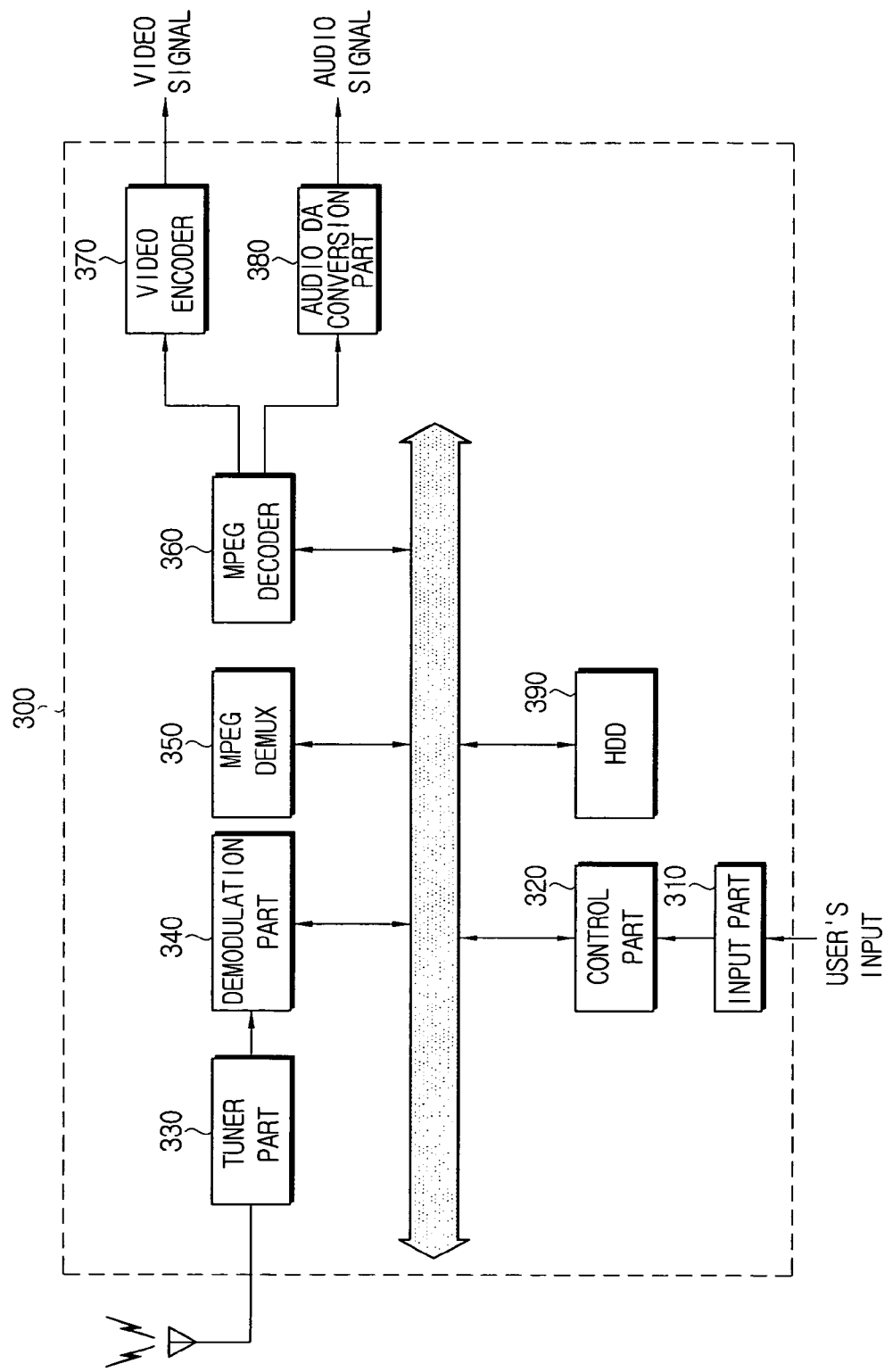
FIG. 2 is a block diagram of a broadcast signal processing apparatus capable of recording and reproducing at a hard disc drive according to an embodiment of the present invention.

FIG. 2 is a block diagram of a PVR set-top box as an example of a broadcast signal processing apparatus capable of recording to and reproducing from a hard disc drive according to an embodiment of the present invention. Referring to FIG. 2, the PVR set-top box comprises an input part 310, a control part 320, a tuner part 330, a demodulation part 340, an MPEG demux 350, an MPEG decoder 360, a video encoder 370, an audio D/A conversion part 380 and an HDD 390.

The input part 310 has keys corresponding to the functions of recording, reproducing and searching, and receives commands for the aforementioned functions from a user using the keys. The control part 320 controls the tuner part 330, the demodulation part 340, the MPEG demux 350, the MPEG decoder 360 and the HDD 390 in response to the received signals such that broadcast signals can be received, stored and reproduced.

The control part 320 records the received broadcast signals in the HDD 390 based on a FAT file system, as discussed above. The control part 320 records broadcast signals to a data region, and updates the FAT of the HDD 390 each time a new recording unit of the data region is used. Such recording units are known as cluster units. The control part 390 records a temporary ending cluster data at the end of the updated data. The cluster end data can be, for example, FFF1 hex. The control part 390 will update the FAT information when new data is stored in the HDD (for a particular file). When new data is stored in the HDD, however, a new temporary cluster end data at the end of the updated data is provided to be used at the position where the last ending cluster is stored. Therefore, one temporary ending cluster file always exists in the FAT information that corresponds to a recorded file. Position information data can be recorded in the FAT and can be consecutively recorded.

The control part 320 replaces the temporary ending cluster data (such as FFF1 hex) with an ending cluster data, such as FFFF hex, indicating a successful file termination in a normal FAT file system when the recording of a file is completed normally. The control part 320 determines if a temporary ending cluster data exists in the FAT when reproducing or searching. If a temporary ending cluster data is found, the control part 320 converts the temporary ending cluster data (FFF1 hex) to an ending cluster data (FFFF hex) such that the absence of ending cluster data due to an abnormal termination and a resultant loss of the file because of its absence can be resolved.

The tuner part 330 tunes a channel corresponding to a channel command control signal produced by the control part 320, and subsequently causes the apparatus 300 to receive a broadcast signal. The demodulation part 340 demodulates the received broadcast signal that has been modulated according to a quadrature phase shift keying (QPSK) modulation scheme.

The MPEG demux 350 divides the demodulated broadcasting signal into a video signal and an audio signal. The MPEG decoder 360 receives the divided broadcasting signal from the MPEG demux 350 and decodes each signal. The decoded video signal is then sent to the video encoder 370, and the decoded audio signal is sent to the audio D/A conversion part 380.

The video encoder 370 converts the received, decoded digital video signal into an analog signal to be externally output, and the audio D/A conversion part 380 converts the received, decoded digital audio signal to an analog signal to be externally output. The HDD 390 receives and records the video and audio signals from the MPEG demux 350 in accordance with command control signals from the control part 320.

Figure 3:
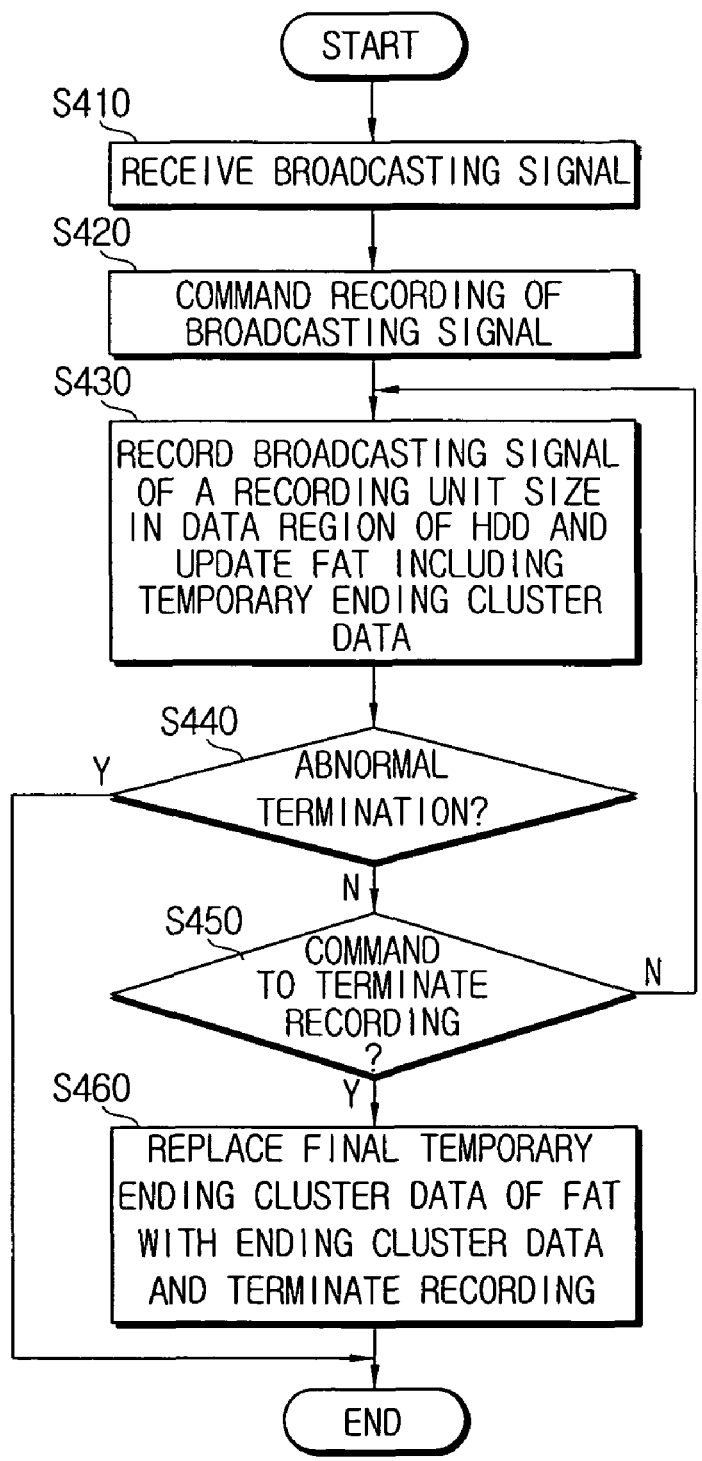
FIG. 3 is a flow chart illustrating a recording method of a broadcast signal processing apparatus capable of recording and reproducing at a hard disc drive according to an embodiment of the present invention.

FIG. 3 is a flow chart provided for the explanation of a recording method of a broadcast signal processing apparatus, which is capable of recording and reproducing at a hard disc drive according to an embodiment of the present invention. Referring to FIGS. 2 and 3, an external broadcast signal is received in step S410. When a command is generated by a user to record the received broadcast signal in step S420, the broadcast signal is recorded in the data region of the HDD 390 and the FAT is updated. As with any other file, the received broadcast signal is recorded in cluster-sized storage units in the HDD. As the received broadcast data is recorded, a temporary ending cluster data is included at the end of the updated data file in step S430.

In the event of abnormal termination, the operation is directly terminated ("Yes" path from decision step S440). At this time, the temporary ending cluster data (FFF1 hex) is recorded-in the FAT, and an ending cluster data (FFFF hex), which is generated when a normal termination occurs, does not exist. If there is no abnormal termination in decision step S440, the method checks to see if there is a record termination command (decision step S450). If there is no record termination command ("No" path from decision step S450), the method reverts back to step S430, and so on. As clusters are filled by the recording of the received broadcast signal, the FAT is updated to reflect all the clusters that have been filled and the current one being filled by the recording of the received broadcast signal. Each time a new cluster is accessed to record the received broadcast signal, the temporary ending cluster data recorded in the FAT is replaced with an ending cluster data.

If a command to terminate recording is received, temporary ending cluster data (FFF1 hex) recorded at the FAT is replaced with an ending cluster data (FFFF hex), and operation is terminated ("Yes" path from decision step S460). As described above, in the event of abnormal termination ("Yes" path from decision step S440), a temporary ending cluster data at the final recording point is utilized to prevent loss of file.

Figure 4:
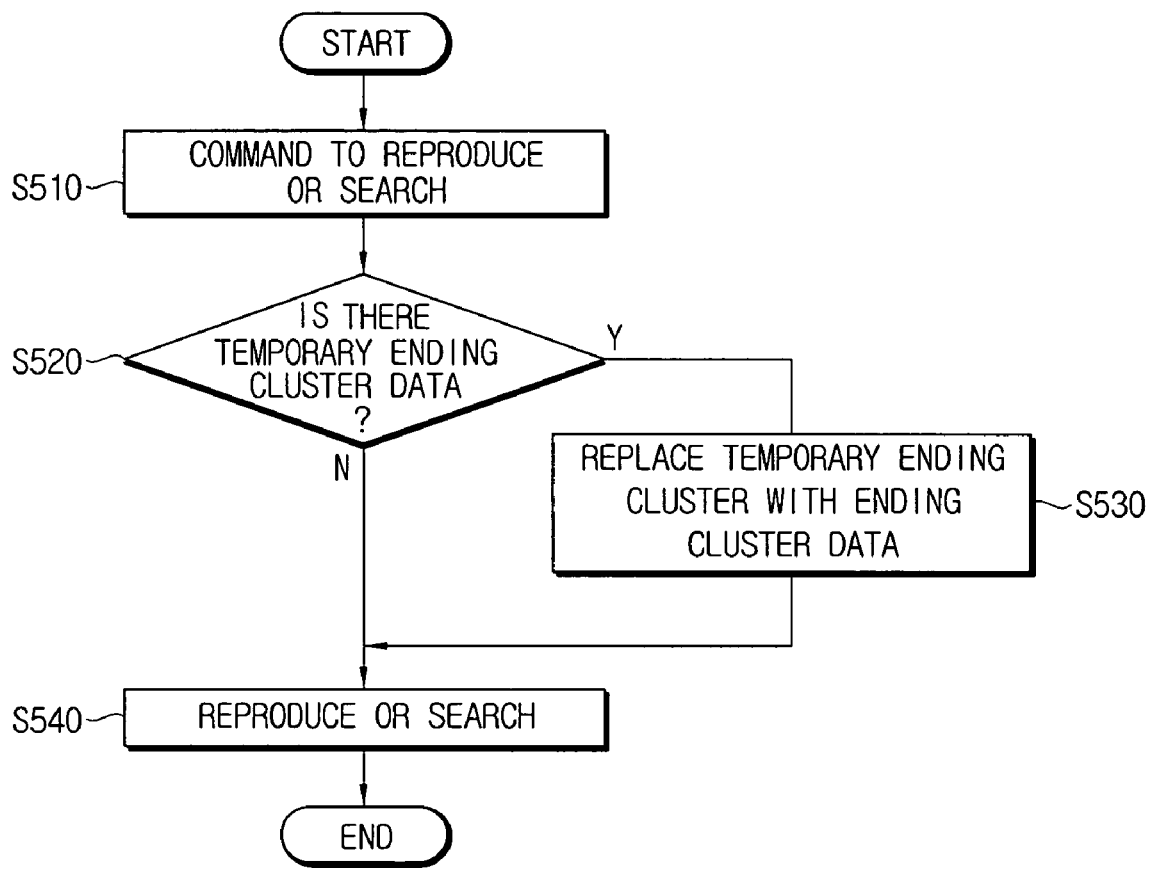
FIG. 4 is a flow chart illustrating a reproducing and searching method of a broadcast signal processing apparatus capable of recording and reproducing at a hard disc drive according to an embodiment of the present invention.

FIG. 4 is a flow chart illustrating a method for reproducing and searching in a broadcast signal processing apparatus capable of recording to, and reproducing from, a hard disc drive according to an embodiment of the present invention. Referring to FIGS. 2 and 4, in step S510 a command is received from the user to reproduce or search for a broadcast signal recorded at the HDD 390. In decision step S520 it is determined if a temporary ending cluster data (FFF1 hex) exists in the FAT because of an abnormal termination. If a temporary ending cluster data (FFF1 hex) does not exist ("No" path from decision step S520), then the recorded broadcast signal is either reproduced or searched according to the command received in step S510 and on the basis of the FAT file system (in step S540). If, however, a temporary ending cluster data (FFF1 hex) does exist ("Yes" path from decision step 520), the temporary ending cluster data (FFF1 hex) is replaced with an ending cluster data (FFFF hex) according to a normal termination (step S530). When the replacement is completed, the abnormally terminated file becomes the same as a file normally terminated. As such, the file can then be reproduced or searched based on the FAT file system (S540).

FIG. 5 is a view provided for the explanation of the operation of a broadcasting signal processing apparatus capable of recording and reproducing at a hard disc drive according to an embodiment of the present invention. Referring to FIG. 5, items (a), (b), (c) and (d) show the FAT update process according to an embodiment of the present invention at time $T_0$, $T_1$, $T_2$ and $T_3$, respectively.

Item (a) shows the recording at the initial record time of $T_0$, $A_0$ and $A_1$ are the updated data in the FAT region corresponding to the recorded broadcast signal, and shows that the temporary ending cluster data FFF1 hex is recorded at the end of the updated data. Item (b) shows the example when the next unit of broadcast signal is recorded at time $T_1$. The temporary ending cluster data of $T_0$ is overwritten (by $A_2$ and $A_3$). The temporary ending cluster data is recorded in the next two data slots. Item (c) is a recording when the next unit of broadcast signal is recorded at time $T_2$, which is recorded in the same manner as in item (b).

If an abnormal termination occurs in the recording of FAT as in items (a) through (c), the abnormal termination is detected during recording or searching, and a temporary ending cluster data FFF1 hex is replaced with an ending cluster FFFF hex. Item (d) shows the FAT when a recording termination command after T2 is received from a user. In response to the recording termination command, a temporary ending cluster data, FFF1 hex, of item (c) is replaced with FFFF hex (that is an ending cluster data according to a normal termination). The temporary ending cluster may not be recorded for every FAT update, but may be recorded a certain number of times according to a system recording ability and a need. Thus, according to the embodiments of the present invention as described above, file loss can be prevented when an abnormal termination is generated in recording a file.

As described above, although an abnormal termination occurs while recording on a HDD recording/reproducing apparatus, information regarding the final point recorded in FAT endures. As such, the point is perceived as a file termination point, and a file loss can be prevented.

The foregoing embodiments and advantages are merely exemplary and are not to be construed as limiting the present invention. The present teaching can be readily applied to other types of apparatuses. Also, the description of the embodiments of the present invention are intended to be illustrative, and not to limit the scope of the claims, and many alternatives, modifications, and variations will be apparent to those skilled in the art.

What is claimed is:

1. A broadcast signal processing apparatus capable of recording and reproducing an externally received broadcast signal on a hard disc drive, comprising:
    a broadcast signal receiving part for receiving a broadcast signal, and demodulating and dividing the received broadcast signal into a video signal and an audio signal;
    a hard disc drive comprising a file allocation table (FAT) and a data region; and
    a control part for recording, searching and reproducing the audio signal and video signal with respect to the hard disc drive based on a single FAT file system, and adding one single identifiable temporary file termination data to an end of updated data when the file allocation table is updated such that a file of said single FAT file system recorded in the hard disc drive comprises said one single identifiable temporary file termination data at said end of updated data, and converting the one identifiable temporary file termination data into a normal file termination data according to a FAT data conversion such that, while the one identifiable temporary file termination data is converted into the normal file termination data, video signal and audio signal data recorded separate of the one identifiable temporary file termination data are not converted, wherein the normal file termination data corresponds to a recording stop signal.

2. The apparatus as claimed in claim 1, wherein the control part is further adapted to overwrite the updated data from a position where the one identifiable temporary file termination data is recorded if the one identifiable temporary file termination data exists when the file allocation table is updated.

3. The apparatus as claimed in claim 1, wherein the control part is further adapted to convert the one identifiable temporary file termination data into the normal file termination data if the one identifiable temporary file termination data exists at the file allocation table during the reproducing and searching of the recorded file.

4. The apparatus as claimed in claim 1, further comprising:
an encoder for encoding at least one of the video signal and the audio signal output from the broadcasting signal receiving part, and wherein the decoded file is recorded at the hard disc drive;
a decoder for converting the video signal output from the encoder into an analog video signal and for providing the analog video signal externally; and
an audio D/A conversion part for converting the audio signal output from the encoder into an analog audio signal and for providing the analog audio signal externally.

5. A hard disc drive recording and reproducing method of a broadcast signal processing apparatus which is capable of recording and reproducing an externally received broadcast signal with respect to a hard disc drive, comprising:
formatting a hard disc drive into a file allocation table (FAT) and a data region;
receiving a broadcast signal, and demodulating and dividing the signal into a video signal and an audio signal;
recording the broadcast signal and video signal onto the hard disc based on a single FAT file system, and adding one single identifiable temporary file termination data at the end of updated data when the file allocation table is updated such that a file of said single FAT file system recorded in the hard disc drive comprises said one single identifiable temporary file termination data at said end of updated data;
terminating recording by converting the one identifiable temporary file termination data, in response to a record stop signal, into a normal file termination data based on a FAT data conversion such that, while the one identifiable temporary file termination data is converted into the normal file termination data, video signal and audio signal data recorded separate of the one identifiable temporary file termination data are not converted; and
reproducing or searching the recorded file based on a file system of the FAT.

6. The method as claimed in claim 5, wherein the step of recording with respect to a hard disc comprises:
overwriting and recording the updated data from a position where the one identifiable temporary file termination data is recorded when updating the file allocation table, if the one identifiable temporary file termination data exists.

7. The method as claimed in claim 5, wherein the step of reproducing or searching comprises:
determining if the one identifiable temporary file termination data exists in the file allocation table corresponding to the file reproduced or searched; and
converting the one identifiable temporary file termination data into the normal file termination data if the one identifiable temporary file termination data exists.

8. The method as claimed in claim 5, further comprising:
encoding at least one of the video signal and the audio signal output from the received broadcast signal, and wherein the encoded file is recorded to the hard disc drive;
converting the encoded video signal into an analog video signal and providing the converted analog video signal externally; and
converting the encoded audio signal into an analog audio signal and providing the converted analog audio signal externally.

* * * * *